(12) United States Patent
Iwatsuka et al.

(10) Patent No.: US 7,338,108 B2
(45) Date of Patent: Mar. 4, 2008

(54) SUN VISOR FOR VEHICLES

(75) Inventors: Yoshiki Iwatsuka, Aichi (JP);
Yasuhiko Kobayashi, Aichi (JP)

(73) Assignees: Kyowa Sangyo Co., Ltd., Aichi (JP);
Shinwa Seiko Co., Ltd., Aichi (JP)

( * ) Notice: Subject to any disclaimer, the term of this patent is extended or adjusted under 35 U.S.C. 154(b) by 0 days.

(21) Appl. No.: 11/475,239

(22) Filed: Jun. 27, 2006

(65) Prior Publication Data

US 2006/0290161 A1    Dec. 28, 2006

(30) Foreign Application Priority Data

Jun. 28, 2005    (JP)    ............................. 2005-188827

(51) Int. Cl.
*B60J 3/00*    (2006.01)
(52) U.S. Cl. ...................................... 296/97.1
(58) Field of Classification Search ............. 296/97.1, 296/97.9; 228/1.1, 110.1; 219/78.01, 89.1
See application file for complete search history.

(56) References Cited

U.S. PATENT DOCUMENTS

| | | | | |
|---|---|---|---|---|
| 4,763,946 A | * | 8/1988 | Robbins et al. | ............. 296/97.1 |
| 4,960,479 A | * | 10/1990 | Yasuda et al. | ................ 156/251 |
| 5,308,136 A | * | 5/1994 | Schwarz et al. | ............ 296/97.1 |
| 5,466,405 A | * | 11/1995 | Viertel et al. | ................ 264/45.4 |
| 5,556,154 A | * | 9/1996 | Vaxelaire | .................... 296/97.1 |
| 5,887,933 A | * | 3/1999 | Peterson | ..................... 296/97.1 |
| 6,012,757 A | * | 1/2000 | Viertel et al. | ............... 296/97.2 |
| 6,634,696 B1 | * | 10/2003 | Tiesler | ........................ 296/97.1 |
| 6,641,197 B1 | * | 11/2003 | Hobson et al. | ............. 296/97.1 |
| 6,669,262 B1 | * | 12/2003 | Crotty et al. | ............... 296/97.1 |
| 7,152,901 B2 | * | 12/2006 | Kleyn | ......................... 296/97.1 |

FOREIGN PATENT DOCUMENTS

| | | |
|---|---|---|
| JP | 2003-260739 | 9/2003 |
| JP | 2004-66964 | 3/2004 |

* cited by examiner

*Primary Examiner*—Kiran B. Patel
(74) *Attorney, Agent, or Firm*—Dennison, Schultz & MacDonald

(57) ABSTRACT

It is an object of the present invention to provide an improved technique of joining a first body part and a second body part of a sun visor body to manufacture a sun visor for vehicles. The representative A sun visor for vehicles comprises a sun visor body, a first and a second body parts to from the sun visor body, a first weld region, a second weld region. The first weld region includes a first weld formed on the first body part and a first weld formed on the second body part. The second weld region includes a second weld formed on the first body part and a second weld formed on the second body part. The first welds formed respectively on the first and second body parts contact each other and are joined together by vibration before the second welds formed respectively on the first and second body parts contact each other. After that, the second welds contact each other and are welded together by vibration as the first welds are welded together by vibration and at this time, the first welds receive a welding pressure that acts between the first and second body parts, thereby controlling a welding pressure that acts upon the second welds during vibration welding.

7 Claims, 4 Drawing Sheets

SUN VISOR FOR VEHICLES

BACKGROUND OF THE INVENTION

1. Field of the Invention

The present invention relates to a sun visor for vehicles.

2. Description of the Related Art

Japanese non-examined laid-open Patent Publication No. 2004-66964 discloses a sun visor for vehicles having a sun visor body formed by joining two pads made of thermoplastic resin together by vibration welding. In the known sun visor, a plurality of welding ribs are provided on one of the pads and welded to the other pad, so that the two parts are joined together.

In vibration welding, it is necessary to apply an appropriate pressure between the two pads. For vibration welding, the end of each of the welding ribs is tapered so as to easily melt. However, in this case, the end of the welding rib may be flattened under the pressure applied between the two pads, before the end of the welding rib melts. Such flattening impairs the appearance of the weld. Further, it is difficult to control the pressure to be applied on the end of the welding rib such that the end of the tapered welding rib melts without being flattened. In this respect, further improvement is required.

SUMMARY OF THE INVENTION

Accordingly, it is an object of the present invention to provide an improved technique of joining a first body part and a second body part of a sun visor body to manufacture a sun visor for vehicles.

The above-described problem can be solved by the features of claimed sun visors and method of manufacturing sun visors. According to the invention, a representative sun visor for vehicles is provided to comprise a sun visor body, a first and a second body parts that are joined together to thereby form an outward form of the sun visor body in part or in entirety. Further, a first weld region is provided in which a first weld formed on the first body part and a first weld formed on the second body part contact each other and are welded together by vibration, so that the first and second body parts are joined together. Further, a second weld region is provided in which a second weld formed on the first body part and a second weld formed on the second body part contact each other and are welded together by vibration, so that the first and second body parts are joined together independently of the first weld region.

The first welds formed on the first and second body parts contact each other and are joined together by vibration before the second welds formed on the first and second body parts contact each other when the first and second body parts are joined together. The second welds contact each other and are welded together by vibration as the first welds are welded together by vibration, and at this time, the first welds receive a welding pressure that acts between the first and second body parts, thereby controlling a welding pressure that acts upon the second welds during vibration welding.

The "sun visor body" in this invention may include both the manner of forming the appearance by the sun visor body itself, and the manner of covering the surface of the sun visor body with a separate cover. Further, the manner of forming the "outward form of the sun visor body in part" typically represents the manner of forming only the outer peripheral region of the sun visor. The manner of forming the "outward form of the sun visor body in entirety" represents the manner of forming the entire sun visor body. Further, the "vibration welding" in this invention may include both ultrasonic welding by longitudinal vibration and vibration welding by transverse vibration, either of which may be appropriately selected according to the shape of the welds or other similar factors. Further, the "welding pressure" represents a pressure applied between the first body part and the second body part for vibration welding. The shapes of the "first welds" and the "second welds" are not particularly limited, but may be appropriately selected. For example, they may have a tapered or enlarged protruding end or have a uniform sectional shape from the proximal end to the distal end.

According to this invention, the first welds formed on the first and second body parts are joined together by vibration earlier than the second welds when the first and second body parts are joined together. Further, when the second welds are welded together by vibration, the first welds receive a welding pressure that acts between the first and second body parts for vibration welding, thereby controlling a welding pressure that acts upon the second welds. Therefore, the second welds can be welded by vibration under proper welding pressure, so that the second welds can be effectively prevented from being flattened under welding pressure.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved sun visors and method for using such sin visors and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
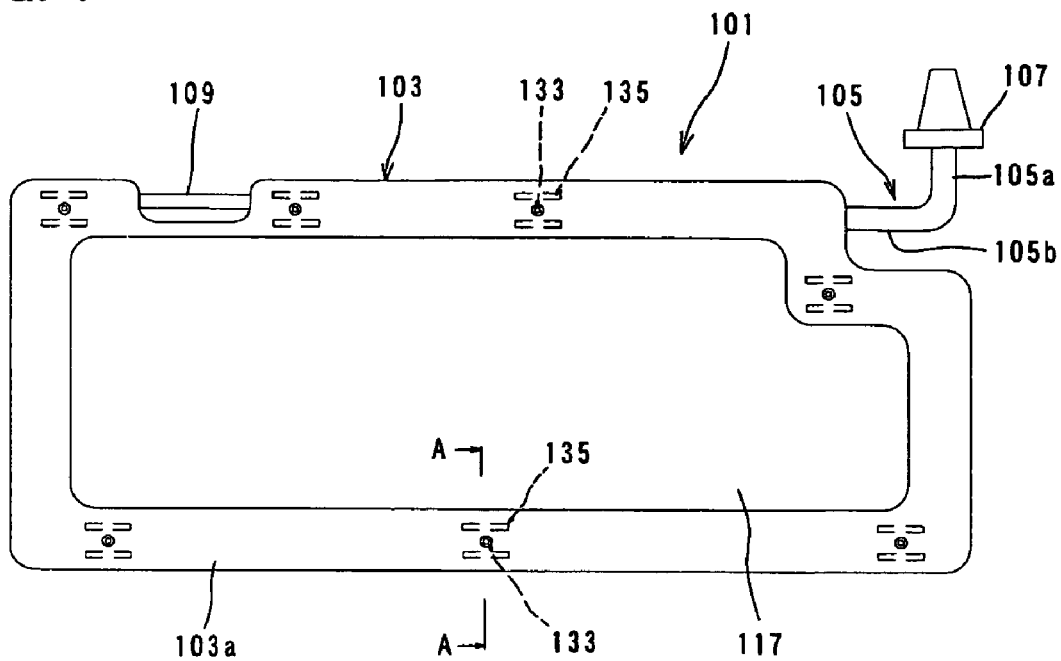
FIG. 1 is a front view showing an entire sun visor for vehicles according to representative embodiment of the invention.
Figure 2:
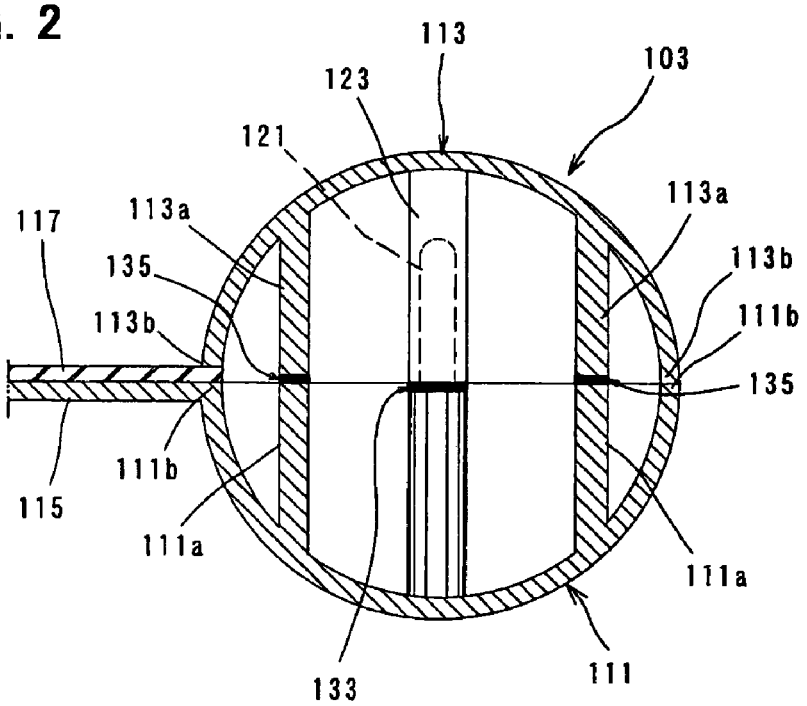
FIG. 2 is a sectional view taken along line A-A in FIG. 1.

A sun visor 101 for vehicles according to a representative embodiment of the present invention is now described with reference to the drawings. FIG. 1 schematically shows the entire construction of the sun visor 101. FIG. 2 is a sectional view taken along line A-A in FIG. 1. As shown in FIG. 1, the sun visor 101 includes a sun visor body 103 and a spindle 105 for mounting the sun visor body 103 to the vehicle. The spindle 105 is generally L-shaped having a vertical spindle portion 105a and a horizontal spindle portion 105b. The horizontal spindle portion 105b of the spindle 105 is mounted to a bearing (not shown) that is incorporated in one corner of the upper edge of the sun visor body 103, such that the sun visor body 103 can pivot about the axis of the horizontal spindle portion 105b with respect to the horizontal spindle portion 105b. The vertical spindle portion 105a of the spindle 105 is mounted to the front corner of the interior roof surface of the vehicle via a mounting bracket 107. The sun visor body 103 mounted to the interior roof surface can be pivoted around the axis of the horizontal spindle portion 105b between a storage position along the interior roof surface and a shield position along the windshield. A support shaft (pin) 109 is provided on the free end portion of the upper edge of the sun visor body 103. The support pin 109 is supported by a hook (not shown) mounted on the interior roof surface, so that the pivotal movement of the sun visor body 103 between the storage position and the shield position can be stabilized.

As shown in FIG. 2, the sun visor body 103 includes a first core 111 and a second core 113 that are joined together by longitudinal vibration welding or by ultrasonic welding. In FIG. 2, welds by ultrasonic welding are shown in solid fill. The first and the second cores 111, 113 are features that respectively correspond to the "first body part" and the "second body part" in this invention. The first and the second cores 111, 113 are made of a material that can be joined by ultrasonic welding, such as thermoplastic resin. The first and the second cores 111, 113 comprise two halves of a generally rectangular, tubular frame portion or periphery 103a (see FIG. 1) of the sun visor body 103.

Specifically, each of the first and second cores 111, 113 have a generally dish-like or bowl-like sectional shape having an opening. The openings of the first and second cores 111, 113 are joined together such that the periphery 103a of the sun visor body 103 has a hollow closed section. With such hollow closed section of the periphery 103a of the sun visor body 103, the flexural rigidity or torsional rigidity of the sun visor body 103 can be effectively ensured. A flat plate-like portion 115 is integrally formed with the first core 111 in a planar region surrounded by the portion of the first core 111 which forms the frame portion of the sun visor body 113. The second core 113 does not have the plate-like portion 115. Instead of being formed in one-piece with the first core, the plate-like portion 115 may be formed separately and thereafter joined in a post-processing. Further, the surface of the plate-like portion 115 is covered with a decorative cover 117.

Figure 3:
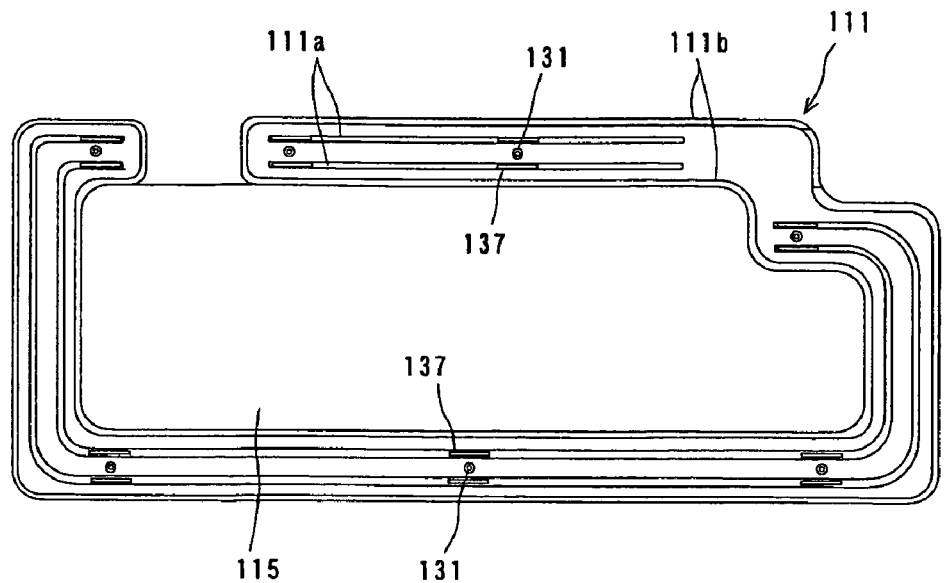
FIG. 3 is a front view of a first core.
Figure 4:
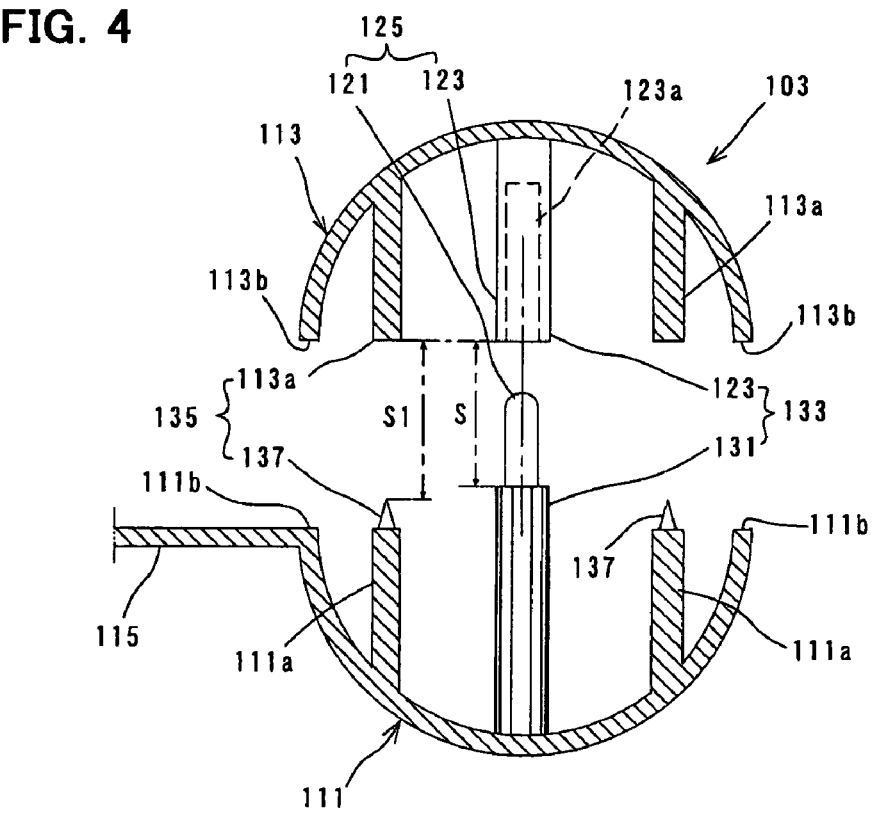
FIG. 4 is a sectional view of the first and second cores which are to be joined together.
Figure 5:
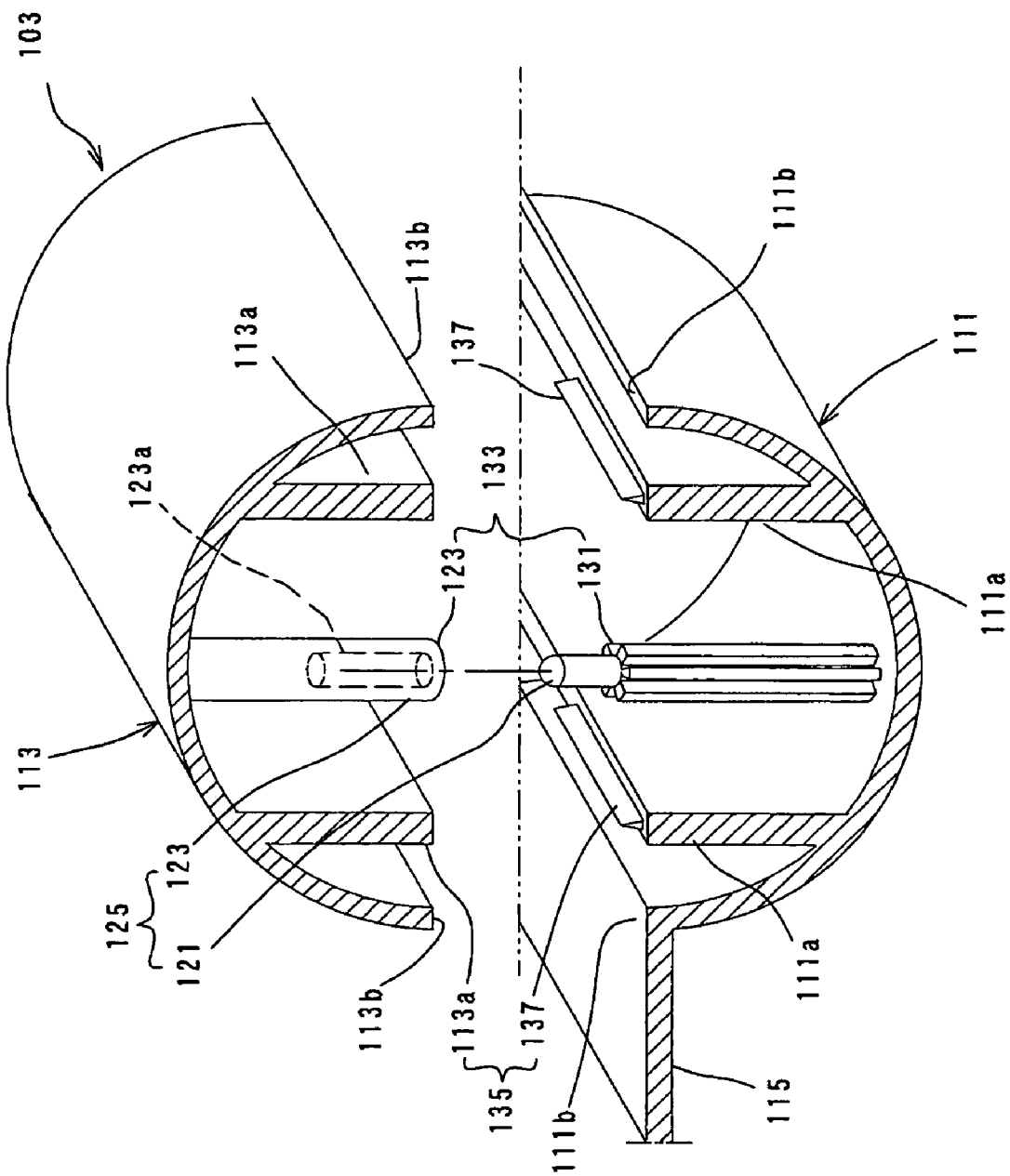
FIG. 5 is a sectional perspective view of the first and second cores which are to be joined together.

FIG. 3 shows the entire first core 111 of the sun visor body 103 which is not yet joined to the second core. FIGS. 4 and 5 show the first and second cores 111, 113 to be joined together, in sectional view. As shown in FIGS. 4 and 5, reinforcing ribs 111a, 113a are integrally formed on the inner surface of the respective first and second cores 111, 113 of a generally dish-like or bowl-like sectional shape and extend in the longitudinal direction. The reinforcing ribs 111a, 113a of the first and second cores 111, 113 are positioned such that the protruding ends of the reinforcing ribs 111a, 113a contact each other when the first and second cores 111, 113 are joined together.

A guide 125 is provided between the first and second cores 111, 113 and serves to guide the welds (which will be described below) of the first core 111 to the welds (which will be described below) of the second core 113. The guide 125 includes a guide pin 121 and a cylindrical portion 123 that receives the guide pin 121. The guide pin 121 is integrally formed in the central region of the first core 111 or between the two reinforcing ribs 111a. The cylindrical portion 123 is integrally formed in the central region of the second core 113 or between the two reinforcing ribs 113a. The guide pin 121 and the cylindrical portion 123 are features that respectively correspond to the "protruding element" and the "open hollow element" in this invention. A plurality of guides 125 is disposed at appropriate intervals in the longitudinal direction of the first and second cores 111, 113, or in the periphery 103a of the sun visor body 103. The guide pin 121 has a cylindrical shape having a spherical or tapered end so as to be easily inserted into a bore 123a of the cylindrical portion 123.

A plurality of first welding ribs 131 are integrally formed on the proximal portion of the guide pin 121. The first welding ribs 131 protrude in the radial direction of the guide pin 121 and have predetermined spacing. The spacing serves as burr escape during welding operation. The guide pin 121 and the first welding ribs 131 are features that correspond to the "stepped element", and the first welding ribs 131 are features that correspond to the "first weld formed on the first body part" in this invention. The ends of the first welding ribs 131 in the longitudinal direction that corresponds to the axial direction of the guide pin 121 contact the open end of the cylindrical portion 123 when the guide pin 121 is fitted into the bore 123a of the cylindrical portion 123. Then, the first welding ribs 131 and the cylindrical portion 123 are joined together by ultrasonic welding. Thus, the cylindrical portion 123 not only serves as a guide element in cooperation with the guide pin 121 but as a weld element. The cylindrical portion 123 is a feature that corresponds to the "first weld formed on the second body part" in this invention. The first welding ribs 131 and the cylindrical portion 123 form a first weld region 133.

Independently of the first weld region 133, a second weld region 135 is provided between the first and second cores 111, 113. The second weld region 135 includes a second welding rib 137 that is formed on the reinforcing rib 111a on the first core 111 and the reinforcing rib 113a on the second core 113. The second weld region 135 is provided on the both sides of the first weld region 133. The second welding rib 137 is a feature that corresponds to the "second weld formed on the first body part" in this invention. The contact portion of the reinforcing rib 113a on the second core 113 with the second welding rib 137 is a feature that corresponds to the "second weld formed on the second body part" in this invention. The second welding rib 137 is integrally formed on the protruding end surface (butting surface between the reinforcing ribs) of the reinforcing rib 111a on the first core 111. Further, the second welding rib 137 is tapered having a triangular shape in section and extends in the longitudinal direction of the reinforcing rib 111a.

The first welding ribs 131 and the cylindrical portion 123 are designed such that they contact each other earlier than the second welding rib 137 and the reinforcing rib 113a when the first and second cores 111, 113 are joined together. Specifically, a distance S between the end surface of the first welding ribs 131 and the end surface of the cylindrical portion 123 is shorter than a distance S1 between the end of the second welding rib 137 and the end surface of the reinforcing rib 113a (see FIG. 4).

The sun visor 101 according to this embodiment is thus constructed. Therefore, when the first and second cores 111, 113 are moved toward each other to be joined together by ultrasonic welding, the guide pin 121 is fitted into the cylindrical portion 123 and guides the first welding ribs 131 to the open end of the cylindrical portion 123. The first welding ribs 131 then contact the open end of the cylindrical portion 123 and are joined to the cylindrical portion 123 by ultrasonic welding before the second welding rib 137 contacts the reinforcing rib 113a. Thereafter, as the ultrasonic welding proceeds, the second welding rib 137 contacts the reinforcing rib 113a and is joined to the reinforcing rib 113a by ultrasonic welding. Therefore, the first welding ribs 131 and the cylindrical portion 123 receive a welding pressure (pressure applied between the first and second cores 111, 113 for ultrasonic welding) that acts between the first and second cores 111, 113 when the second welding rib 137 and the reinforcing rib 113a are joined together by ultrasonic welding. Thus, a welding pressure that acts between the second welding rib 137 and the reinforcing rib 113a during ultrasonic welding is controlled.

In this case, the welding pressure that acts between the second welding rib 137 and the reinforcing rib 113a can be appropriately adjusted by changing the sectional area of the weld between the first welding ribs 131 and the cylindrical portion 123 in the first weld region 133. In the welded state, the open ends 111b, 113b of the first and second cores 111, 113 are in close contact with each other, and the sun visor body 103 having the tubular periphery 103a is provided.

As mentioned above, according to this embodiment, in joining the first and second cores 111, 113 together by ultrasonic welding, a welding pressure acts between the second welding rib 137 and the reinforcing rib 113a when the second welding rib 137 and the reinforcing rib 113a are joined together by ultrasonic welding. The welding pressure can be controlled by the first welding ribs 131 and the cylindrical portion 123. As a result, the second welding rib 137 and the reinforcing rib 113a can be joined together by ultrasonic welding under proper welding pressure. Therefore, even if the end of the second welding rib 137 is tapered so as to easily melt, the end of the second welding rib 137 can be effectively prevented from being flattened before melting.

Further, according to this embodiment, in order to join the first and second cores 111, 113 together, the guide 125 having the guide pin 121 and the cylindrical portion 123 can guide the first welding ribs 131 on the first core 111 to the open end of the cylindrical portion 123 on the second core 113. Therefore, positional misregistration between the first welding ribs 131 and the cylindrical portion 123 can be prevented so that the first and second cores 111, 113 can be joined together in a proper positional relationship.

Further, according to this embodiment, in the state in which the first and second cores 111, 113 are joined together, the engagement structure of the guide pin 121 and the cylindrical portion 123 can receive an external force in a direction crossing the engaging direction or in a direction crossing the direction of the welding force that acts upon the first welding ribs 131. As a result, not only the first weld region 133 but the second weld region 135 can have increased weld strength.

Further, according to this embodiment, the sun visor body 103 formed by the first and second cores 111, 113 joined together has the periphery 103a with a hollow closed section. Therefore, the flexural rigidity or torsional rigidity of the sun visor body 103 can be efficiently ensured. The hollow closed section can be appropriately shaped, for example, into a circular, oval or rectangular shape.

Further, according to this embodiment, the first weld region 133 is arranged in the central region of the hollow closed section, and the second weld region 135 is arranged on the both sides of the first weld region 133. Therefore, when the first and second cores 111, 113 are joined together, the first weld region 133 can receive the pressure that acts upon the second weld region 135, in a balanced manner.

Further, the cylindrical portion 123 has been described as serving not only as the guide 125 but as the first weld, but the guide may be disposed separately from the weld. Further, the shapes of the first welding ribs 131 and the second welding rib 137 are not limited to those shown in the drawings, but may be appropriately changed.

Next, a modification of this invention will be explained with reference to FIGS. 6 and 7. This modification relates to a technique for providing a pocket (ticket holder) 141 on the sun visor body 103 that is formed by the first and second cores 111, 113 joined together. It is an object of this modification to provide an effective technique for minimizing the size of the first and second cores 111, 113 when providing the pocket 141.

Figure 6:
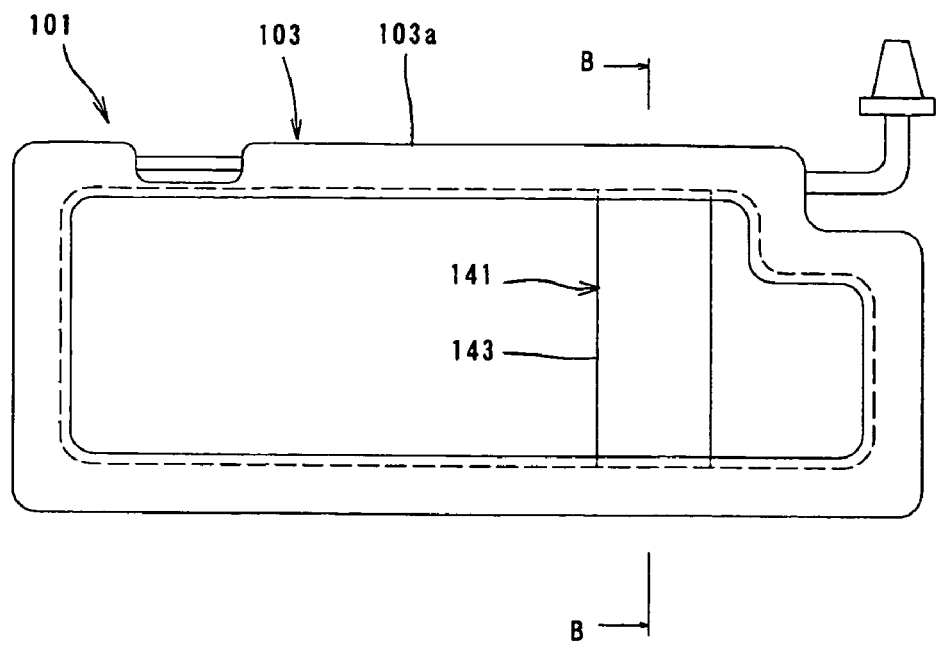
FIG. 6 is a front view showing an entire sun visor for vehicles according to a modification of the present invention.

As shown in FIG. 6, the pocket 141 is provided on part of the surface of the sun visor body 103 (the surface facing with the vehicle interior in the shield position). The pocket 141 is formed by sewing two opposed sides of a rectangular sheet 143 onto the surface of the decorative cover 117 that covers the plate-like portion 115 of the first core 111. The sheet 143 is disposed across the upper and lower edges of the periphery 103a of the sun visor body 103. A seam 143a of the sheet 143 on the cover 117 is formed in a position corresponding to the positions of the upper and lower edges of the periphery 103a of the sun visor body 103.

Figure 7:
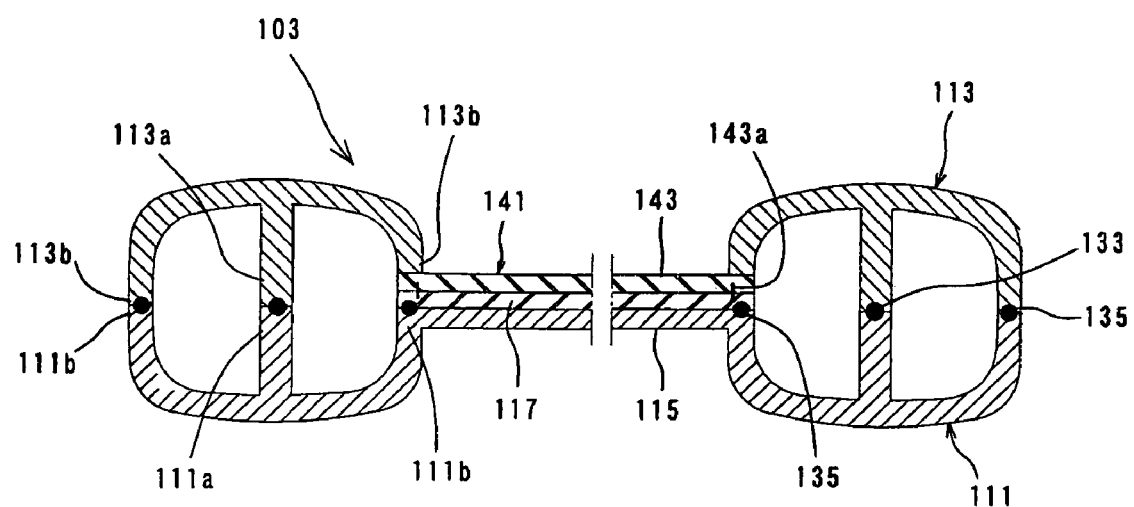
FIG. 7 is a sectional view taken along line B-B in FIG. 6.

As shown in FIG. 7, the cover 117 on which the sheet 143 is sewed is super posed on the surface of the plate-like portion 115 of the first core 111 and the outer edge of the cover 117 is joined to the plate-like portion 115 by ultrasonic welding when the first and second cores 111, 113 are joined together. At this time, the seam 143a of the sheet 143 is covered with the inner peripheral portion of the open end 113b of the second core 113. Preferably, the technique of ultrasonic welding of the first and second cores 111, 113 in the above-mentioned embodiment is followed. For example, like in the above-mentioned embodiment, the first weld region 133 can be provided between the reinforcing ribs 111a, 113a on the inside of the first and second cores 111, 113, and the second weld 135 can be provided between the open ends 111b, 113b of the first and second cores 111, 113. In FIG. 7, welds by ultrasonic welding are shown by circles in solid fill.

In order to provide the pocket 141 on the sun visor body 103, as an alternative method, it may be conceivable that the ends of the sheet 143 are inserted into the hollow portion defined by the first and second cores 111, 113 and are joined by ultrasonic welding to welding ribs provided in the hollow portion. In such a construction, however, a space for the welding ribs for joining the sheet must be ensured within the first and second cores 111, 113, and the first and second cores 111, 113 are enlarged by the space. Therefore, this modification can overcome such a problem with the construction in which the sheet 143 is sewed on the cover 117 to form the pocket 141 and can achieve reduction in size of the first and second cores 111, 113. Further, the ends of the sheet 143 are not only sewed onto the cover 117 but fixedly pinched between the plate-like portion 115 and the inner peripheral portion of the open end 113b of the second core 113, so that the peeling strength of the sheet 143 can be efficiently enhanced. Further, the seam 143a of the sheet 143 is covered with the inner peripheral portion of the open end 113b of the second core 113, so that the appearance is not impaired.

DESCRIPTION OF NUMERALS 101 sun visor for vehicles
103 sun visor body
103a periphery
105 spindle
105a vertical spindle portion
105b horizontal spindle portion
107 mounting bracket
109 support pin
111 first core (first body part)
111a reinforcing rib
111b open end
113 second core (second body part)
113a reinforcing rib (second weld)
113b open end
115 plate-like portion
117 cover
121 guide pin (protruding element)
123 cylindrical portion (open hollow element, first weld)
123a bore
125 guide
131 first welding rib (first weld)
133 first weld region
135 second weld region
137 second welding rib (second weld)
141 pocket
143 sheet
143a seam

What is claimed is:

1. A method of manufacturing a sun visor for vehicles, wherein the sun visor has a sun visor body, a first and a second body parts that are joined together to form an outward form of the sun visor body in part or in entirety, a first weld region that includes a first weld formed on the first body part and a first weld formed on the second body part, a second weld region that includes a second weld formed on the first body part and a second weld formed on the second body part, comprising steps of:

welding the first welds formed respectively on the first and second body parts to each other by vibration before the second welds formed respectively on the first and second body parts contact to each other, welding the second welds on the first and second body parts to each other by vibration as the first welds are being welded together by vibration and at this time, the first welds receive a welding pressure that acts between the first and second body parts, thereby controlling a welding pressure that acts upon the second welds during vibration welding.

2. A method as defined in claim 1, wherein the first and second body parts are joined by longitudinal vibration welding or by ultrasonic welding at the first and second weld regions.

3. A method as defined in claim 1, wherein the sun visor further comprising a guide that guides the first weld formed on the first body part to the first weld formed on the second body part in the first weld region, wherein, when the second welds contact each other and are welded together by vibration, the first welds in contact with each other receive the welding pressure that acts between the first and second body parts while being guided by the guide.

4. A method as defined in claim 3, wherein the guide includes a protruding element formed on one of the first and second body parts and an open hollow element formed on the other of the first and second body parts, the open hollow element receiving the protruding element and, wherein the first weld is formed on the protruding element and has a stepped element, the stepped element contacting with an opening of the open hollow element so as to be welded by vibration when the protruding element is fitted into the open hollow element.

5. A method as defined in claim 1, wherein one or both of the second welds formed on the first and second body parts are tapered toward the opposed second weld.

6. A method as defined in claim 1, wherein each of the first and second body parts has a sectional configuration having an opening in a position corresponding to a peripheral region of the sun visor body and wherein the openings of the first and second body parts are joined together so that a hollow closed section is formed in the peripheral region of the sun visor body.

7. A method as defined in claim 1, wherein the first weld region is provided in a central region of the hollow closed section and the second weld region is arranged on the both sides of the first weld region.

* * * * *